United States Patent [19]
Pniel

[11] Patent Number: 6,141,160
[45] Date of Patent: Oct. 31, 2000

[54] VISION ASSIST ASSEMBLY FOR A SINGLE EYE VISION DEVICE

[75] Inventor: Zeev Pniel, Petach Tikva, Israel

[73] Assignee: International Technologies (Laser) Ltd., Rishon Lezion, Israel

[21] Appl. No.: 09/270,782

[22] Filed: Mar. 17, 1999

[51] Int. Cl.[7] .................................................. G02B 07/02
[52] U.S. Cl. ............................................................. 359/822
[58] Field of Search .................................. 359/630, 632, 359/822

[56] References Cited

U.S. PATENT DOCUMENTS

| | | | |
|---|---|---|---|
| 4,364,636 | 12/1982 | Ellis | 350/632 |
| 5,543,968 | 8/1996 | Freeman et al. | 359/631 |
| 5,752,276 | 5/1998 | Baudou et al. | 2/6.3 |
| 5,786,932 | 7/1998 | Pniel | 359/409 |

*Primary Examiner*—Ricky Mack
*Attorney, Agent, or Firm*—Mark M. Friedman

[57] ABSTRACT

A vision assist assembly, is provide, for selectable positioning of a one eye vision device in front of an eye of a wearer. The vision assist assembly includes a head cover mounting element for mounting on a head cover, such as a helmet and a positioning element having a proximal end portion and a distal end portion being directly or indirectly connected to the head cover mounting element via the proximal end portion. The positioning element includes an extended arm having a shaft being connected to, or integrally formed with, the distal portion. The shaft serves for mounting thereon the one eye vision device. The arm being capable of rotational movement with respect to the head cover mounting element in front of, and sideways, across the face of the wearer, such that when the head cover mounting element is mounted at a central location of the head cover, the one eye vision device is positionable in front of an eye of the wearer while, at the same time, the shaft is positioned external to the interpupillary distance of the wearer.

16 Claims, 3 Drawing Sheets

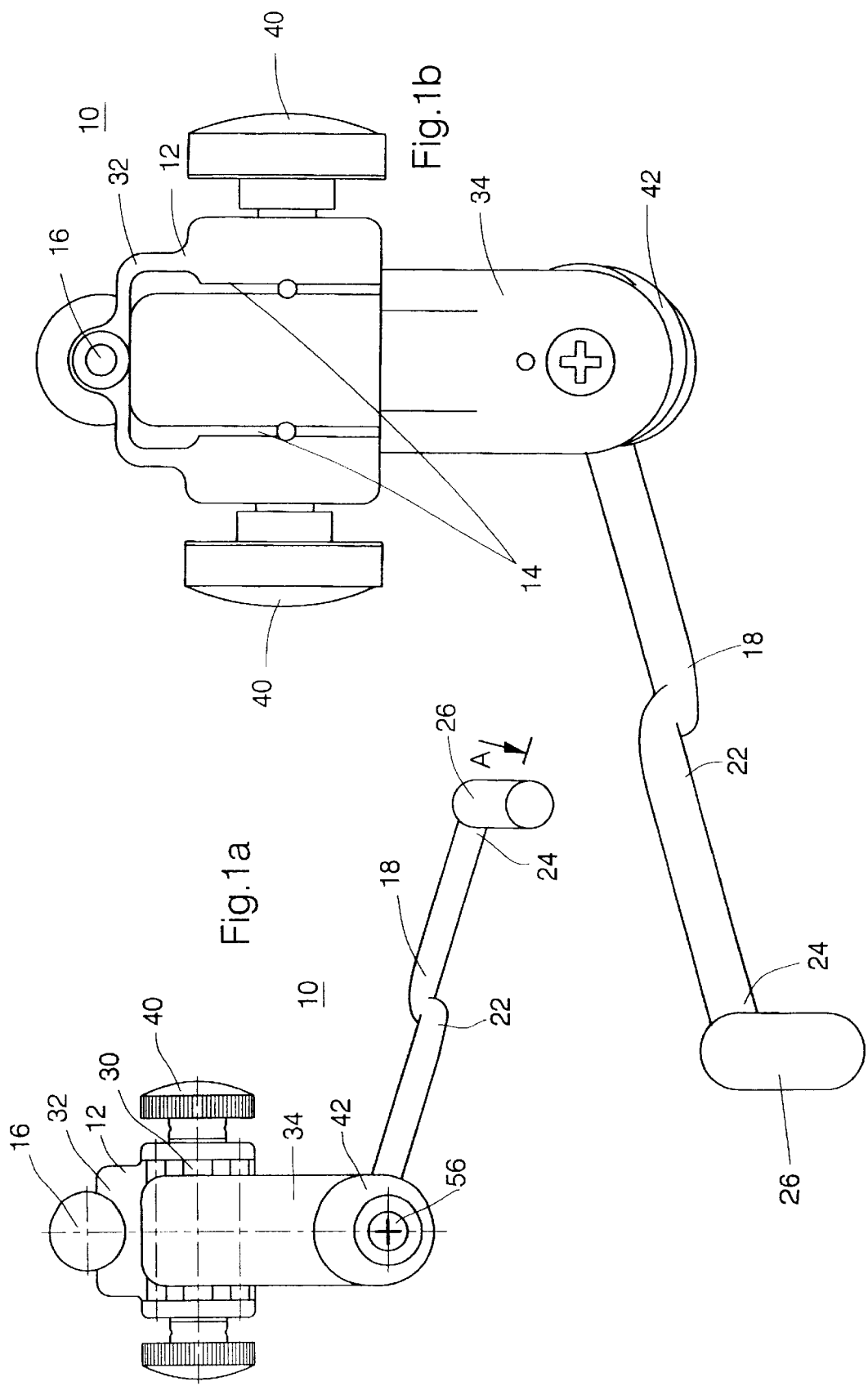

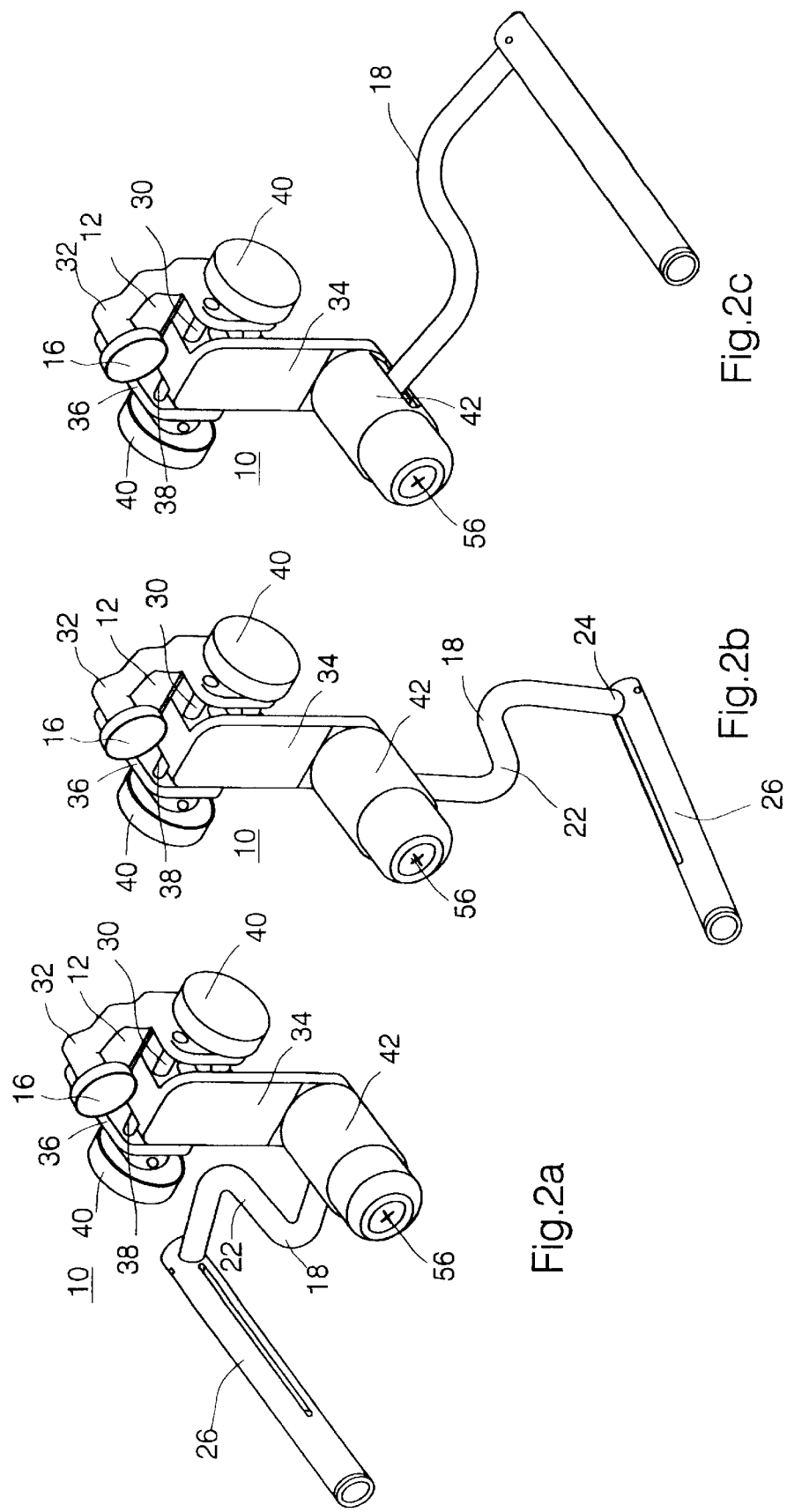

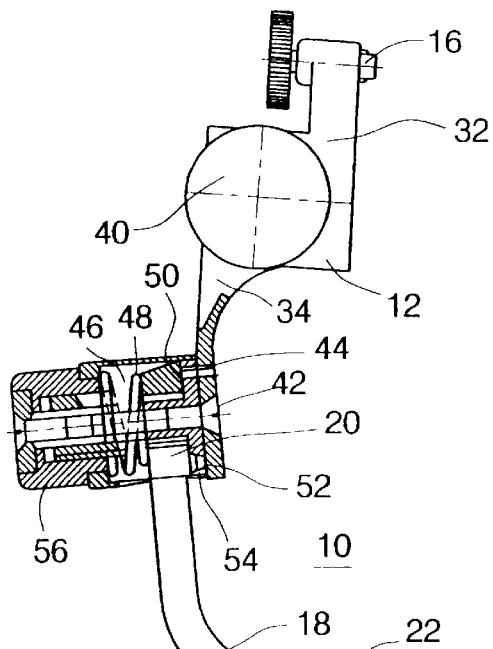
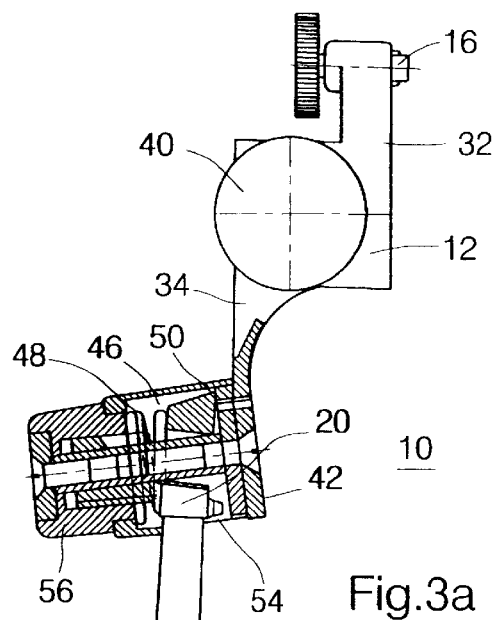
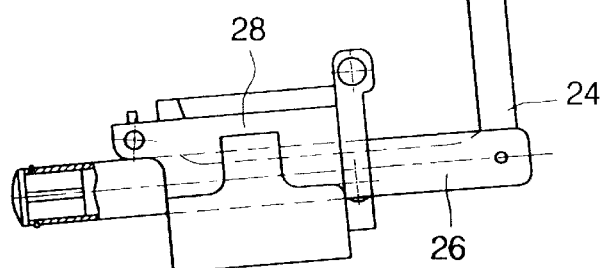
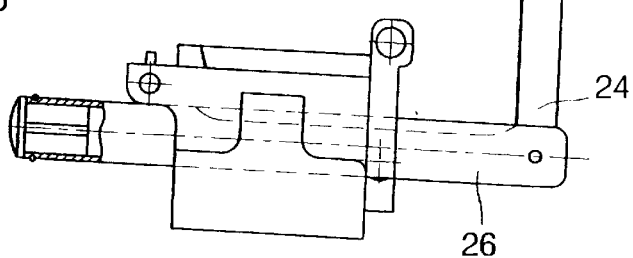
Fig. 3b
Fig. 3a

VISION ASSIST ASSEMBLY FOR A SINGLE EYE VISION DEVICE

FIELD AND BACKGROUND OF THE INVENTION

The present invention relates to a vision assist assembly for a single eye vision device and, more particularly, to such an assembly which can be (i) operatively attached to a protective head mount, such as a helmet, which is typically worn covering the forehead down to the eyes; (ii) used for selectable positioning the single eye vision device in front of the left or right eyes of the wearer by a simple sideways rotational movement in front and across the face of the wearer, thereby obviating the need for demounting the single eye vision device for such repositioning; and (iii) set aside the face when not in use, so as to minimally interfere with the naked eye field of view of the wearer.

Various types of single eye vision devices are known, some of which have specific advantages when head mounted in front of an eye of the wearer, as it leaves the hands thereof free to perform other duties. For obvious reasons, head mounted single eye vision devices, especially single eye night vision devices, are of specific importance for law enforcing agencies and armies, wherein individuals using such devices are requested to perform a plurality of other duties with their hands.

It is well recognized that while using a single eye vision device, especially such a device which produces an artificial image, e.g., a one eye night vision device, the user is, from time to time, required to change the viewing eye because continuously viewing through such an optical instrument is tiring for the eye.

U.S. Pat. No. 5,786,932 to Panel teaches a single eye vision assist device which includes a head mount, a vision assist assembly mounted on the head mount for selectable positioning in front of an eye of a wearer and a positioning apparatus for positioning the vision assist assembly on the head mount. Positioning according to Panel is effected by an apparatus capable of axial movement along an axis generally substantially orthogonal to the face of a wearer and rotational movement about the axis into and out of a position in front of the eye of the wearer. Thus, according to U.S. Pat. No. 5,786,932, the single eye vision device is rotated along the interpupillary distance between the eyes, and while at its non-use position it engages a central face position or above the eye (when a helmet is not worn).

This design has limitations because while at its non-use position the device blocks a large fraction of the naked eye field of view of the wearer. In addition, this design is at all not applicable for use with a helmet, which under field conditions, is worn down to the eyes, covering the entire forehead, for providing maximal protection.

In an attempt to overcome the above limitations, Litton Systems Inc. Electro-optical Systems Division, Tempe Operations 1215S, 52$^{nd}$ St., Tempe, Ariz. 85281, USA; and ITT Electrooptical Products Division 7635 Plantation Rd. Roanoke, Va. 24019, USA, have each independently developed a one eye vision device which includes a pair of dovetail or similar constructions, one for each eye, which are used for mounting the device onto a central vision assist assembly mounted on a helmet.

This design has a major limitation because in the process of repositioning the device for use by either eye, the device needs to be demounted from the vision assist assembly and remounted thereon using the other dovetail. This operation requires to remove the helmet from the head which is both cumbersome and in certain situations, dangerous.

There is thus a widely recognized need for, and it would be highly advantageous to have, a vision assist assembly devoid of the above limitations, which vision assist assembly is operatively attachable to a protective head mount, such as a helmet, which is typically worn covering the forehead down to the eyes; is used for selectable positioning the single eye vision device in front of the left or right eyes of the wearer by a simple sideways rotational movement in front and across the face of the wearer, thereby obviating the need for demounting the single eye vision device during such repositioning; and can be set aside the face of the wearer when not in use, so as to minimally interfere with the naked eye field of view of the wearer.

SUMMARY OF THE INVENTION

According to the present invention there is provided a vision assist assembly for selectable positioning of a one eye vision device in front of an eye of a wearer comprising (a) a head cover mounting element for mounting the vision assist assembly on a head cover; and (b) a positioning element having a proximal end portion and a distal end portion being directly or indirectly connected to the head cover mounting element via the proximal end portion, the positioning element including an extended arm having a shaft being connected to or integrally formed with the distal portion, the shaft being for mounting thereon the one eye vision device, the arm being capable of rotational movement with respect to the head cover mounting element in front of and sideways across the face of the wearer, such that when the head cover mounting element is mounted at a central location of the head cover, the one eye vision device is positionable in front of an eye of the wearer while, at the same time, the shaft is positioned external to the interpupillary distance of the wearer.

According to further features in preferred embodiments of the invention described below, when the head cover mounting element is mounted at the central location of the head cover, the positioning element is rotatable to a position in which the one eye vision device is positioned in at least one non-use position external to the interpupillary distance of the wearer.

According to still further features in the described preferred embodiments the head cover mounting element includes a dovetail construction for mounting the vision assist assembly on a matching construction of the head cover.

According to still further features in the described preferred embodiments the head cover mounting element includes an interpupillary distance adjusting mechanism, whereas the positioning element being directly or indirectly connected to the head cover mounting element via the interpupillary distance adjusting mechanism.

According to still further features in the described preferred embodiments the vision assist further comprising a connector assembly being connected to the head cover mounting element, the proximal end portion of the positioning element being engaged in the connector assembly, the connector assembly being constructed so as to enable the rotational movement in front and sideways across the face of the wearer, and further so as to enable an additional rotational movement in a direction substantially orthogonal to the rotational movement and away from or closer to the face of the wearer, so as to enable the wearer to comfortably change a position of the one eye vision device from one eye to the other by pulling the positioning element away from the face while rotating the positioning element sideways across the face.

According to still further features in the described preferred embodiments the connector assembly includes a chamber engaging the proximal end portion of the positioning element, the chamber houses a biasing mechanism which serves for biasing the proximal end portion of the positioning element against a rear wall of the chamber, thereby enabling pulling the positioning element away from the face while rotating the positioning element sideways across the face.

According to still further features in the described preferred embodiments the connector assembly includes at least two securing mechanisms for securing the positioning element at one of the securing mechanisms at a time.

According to still further features in the described preferred embodiments the connector assembly includes a locker for locking the positioning element at a desired position.

According to still further features in the described preferred embodiments the arm is substantially Z-shaped.

The present invention successfully addresses the shortcomings of the presently known configurations by providing a vision assist assembly which is operatively attached to a head mount, such as a helmet, which is typically worn covering the forehead down to the eyes; can be used for selectable positioning the single eye vision device in front of the left or right eyes of the wearer by a simple rotational movement, thereby obviating the need for demounting the single eye vision device for such positioning; and is set aside the face when not in use, so as to minimally interfere with the naked eye field of view.

BRIEF DESCRIPTION OF THE DRAWINGS

The invention is herein described, by way of example only, with reference to the accompanying drawings, wherein:

FIGS. 1a–b are frontal and rear views, respectively, of the vision assist assembly according to the present invention;

FIGS. 2a–c are perspective views of three operation modes of the vision assist assembly according to the present invention, demonstrating the sideways rotational movement of a positioning element thereof in front and across the face of a wearer; and FIGS. 3a–b are cross-sectional views of two operation modes of the vision assist assembly according to the present invention, demonstrating a rotational movement of the positioning element closer to, and away from, the face of the wearer, respectively.

DESCRIPTION OF THE PREFERRED EMBODIMENTS

The present invention is of a vision assist assembly for a single eye vision device which can be used for positioning the single eye vision device in front of an eye of a wearer. Specifically, the present invention can be used to position the single eye vision device in front of either of the eyes of the wearer without the need for demounting the single eye vision device.

The principles and operation of a vision assist assembly according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Referring now to the drawings, FIGS. 1a–3b illustrate the vision assist assembly according to the present invention, which is referred to hereinbelow as vision assist assembly 10.

Vision assist assembly 10 serves for selectable positioning of a one eye vision device in front of an eye of a wearer. Vision assist assembly 10 includes a head cover mounting element 12. Head cover mounting element 12 serves for mounting vision assist assembly 10 on a head cover, such as a protective head cover, e.g., a helmet.

To this end, according to a preferred embodiment of the present invention, head cover mounting element 12 includes a dovetail construction 14 (shown in FIG. 1b) which serves for mounting vision assist assembly 10 on a matching construction attached to or formed with the head cover. It will, however, be appreciated by one ordinarily skilled in the art that a dovetail construction can alternatively be provided on the head cover. In this case, head cover mounting element 12 is formed with the matching construction. Other mechanisms of mounting head cover mounting element 12 on a head cover other than those involving a dovetail are envisaged.

Head cover mounting element 12 preferably further includes a locking mechanism, such as a locking screw 16 supplemented with a screwing knob. Locking mechanism 16 serves for locking head cover mounting element 12 in its mounted position on the head cover.

Vision assist assembly 10 according to the present invention further includes a positioning element 18 which is directly or indirectly connected to head cover mounting element 12 via a proximal end portion 20 (FIGS. 3a–b) thereof. Positioning element 18 includes an extended arm 22 having a shaft 24 connected to, or integrally formed with, a distal portion 26 of arm 22.

According to a preferred embodiment of the present invention arm 22 is substantially Z-shaped, i.e., it is formed of two substantially parallel terminal segments and a connecting segment therebetween which forms an angle of 85–105°, preferably about 90°, with each of the terminal segments. Arm 22 is so constructed so as to prevent spatial disturbance with the periphery of the protective head cover.

Shaft 24 serves for mounting thereon the one eye vision device. In FIGS. 3a–b a prior art adapter/operator 28 of a one eye vision device is shown mounted on shaft 24. The construction and operation of adapter/operator 28 are described in U.S. Pat. No. 5,786,932, which is incorporated by reference as if fully set forth herein (see, for example, FIG. 10 therein). Adapter/operator 28 is translatable along shaft 24, so as to enable the wearer to bring the one eye vision device connected thereto closer and farther from the eye. In addition, adapter/operator 28 is 360° rotatable about shaft 24.

Arm 22 of positioning element 18 is capable of a sideways rotational movement with respect to head cover mounting element 12 in front of, and across, the face of the wearer. As a result, when head cover mounting element 12 is mounted at a central location of the head cover, the one eye vision device is positionable in front of an eye of a wearer while, at the same time, shaft 24 is positioned external to the interpupillary distance of the wearer. This feature of the present invention is of particular importance when vision assist assembly 10 is mounted on a protective head cover which is worn covering the forehead of the wearer, down to the eyes.

It is important to note, in this respect, that in the vision assist assembly disclosed in U.S. Pat. No. 5,786,932 (i) when the vision assist assembly is mounted at a central location of the head cover, the one eye vision device is positionable in front of an eye of a wearer while, at the same time, the shaft employed therein is positioned internal to the interpupillary distance of the wearer; and (ii) attempting to implement the vision assist assembly described therein on a protective head cover which is worn covering the forehead down to the eyes, would result in positioning of the one eye night vision device far below the eyes, against a cheek of the wearer. Indeed, when shown used with a helmet, the helmet is dislocated to a less protective upward position (see, for example, FIGS. 3 and 7 of U.S. Pat. No. 5,786,932).

According to a preferred embodiment of the present invention head cover mounting element 12 includes an interpupillary distance adjusting mechanism 30. According to this embodiment of the present invention, element 12 includes a first portion 32 which includes dovetail structure 14 and a second portion 34, to which positioning element 18 is directly or indirectly connected, which is translatably engaged by first portion 32, to thereby effect a horizontal translation of portion 34 and positioning element 18. Thus, as best seen in FIGS. 3*a–b*, portion 32 is formed with a recession 36 and at least one stationary rod 38 engaged therein. Portion 34 is translatably engaged within recession 36, translatably mounted on rod 38. Interpupillary adjusting and locking screws 40, supplemented with screwing knobs, serve, according to this embodiment of the present invention, to adjust and lock the position of second portion 34 with respect to first portion 32 of head cover mount element 12 of vision assist assembly 10. Since the interpupillary distance of different individuals differ up to two cm, portion 34 is preferably translatable along about one cm. This feature, combined with the sideways rotational movement of positioning element 18, translates to a total of two cm interpupillary distance adjustability.

According to a preferred embodiment of the present invention, when head cover mounting element 12 is mounted at the central location of the head cover, positioning element 18 is rotatable to a position in which the one eye vision device is positioned in at least one non-use position external to the interpupillary distance of the wearer. Thus, when there is no longer need for the one eye vision device, it is set aside the face of the wearer, thereby not blocking the naked eye field of view of the wearer when not in use, and further not adding height to the wearer, which may be disadvantageous when hiding, etc. It will be appreciated however, that by providing the one eye vision device with a rotational movement about shaft 24, e.g., by means of adapter/operator 28, one can achieve a similar result.

According to a preferred embodiment of the present invention vision assist assembly 10 further includes a connector assembly 42. Assembly 42 is connected to head cover mounting element 12, e.g. via pins 44. Proximal end portion 20 of positioning element 18 is engaged by connector assembly 42. Connector assembly 42 is constructed so as to enable the sideways rotational movement of element 18 in front and across the face of the 15 wearer, and further so as to enable an additional rotational movement in a direction substantially orthogonal to the above sideways rotational movement, i.e., away from, or closer to, the face of the wearer, so as to enable the wearer to comfortably change a position of the one eye vision device from one eye to the other, by pulling positioning element 18 away from the face, while at the same time rotating is sideways across the face to the other eye.

As specifically shown in FIGS. 3*a–b*, to this end, connector assembly 42 includes a chamber 46 in which proximal end portion 20 of positioning element 18 is engaged. Chamber 46 houses a biasing mechanism 48, e.g., a spiral spring, which serves for biasing proximal end portion 20 of positioning element 18 against a rear wall 50 of chamber 46. Pulling element 18 away from the face of the wearer is enabled by overcoming the biasing force of biasing mechanism 48. This construction allows freedom of rotation in all directions, thereby enabling pulling positioning element 18 away from the face while rotating it sideways across the face. Pulling positioning element 18 away from the face while rotating it sideways across the face is required because of the nose which protrudes from the face and would be in the way of element 18 if would have been only rotated sideways within a plane in front of the face of the wearer. Biasing mechanism serves also to bring positioning mechanism 18 and the one eye vision device back closer to the face of the wearer when the sideways rotation is satisfactory completed.

According to a preferred embodiment of the present invention, connector assembly 18 includes at least two securing mechanisms 52, for securing positioning element 18 at one of securing mechanisms 52 at a time. In the example shown in FIGS. 3*a–b*, securing mechanisms 52 are realized as at least two grooves formed in rear wall 50 of chamber 46, the grooves serve for securely accommodating a pin 54 attached or integrally formed with proximal end portion 20 of positioning element 18, thereby preventing unwanted sideways movement of positioning element 18 when secured.

In addition, according to another preferred embodiment of the present invention, connector assembly 42 further includes a locker 56 for locking positioning element 18 at a desired position. Locker 56 is realized in the examples provided as a locking screw which forces proximal end portion 20 of element 18 against rear wall 50 of chamber 46, thereby fixating its position.

The vision assist assembly of the present invention has several advantages over the prior art, as follows.

First, the vision assist assembly of the present invention can be operatively attached to a protective head mount, such as a helmet, which is typically worn covering the forehead of the wearer down to the eyes for maximal protection.

Second, the vision assist assembly of the present invention can be used for selectable positioning a single eye vision device in front of the left or right eyes of the wearer by a simple sideways rotational movement in front and across the face of the wearer, thereby obviating the need for demounting the single eye vision device during such repositioning.

Finally, the vision assist assembly of the present invention can be set aside the face of the wearer when not in use, so as to minimally interfere with the naked eye field of view thereof.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A vision assist assembly for selectable positioning of a one eye vision device in front of an eye of a wearer comprising:
    (a) a head cover mounting element for mounting the vision assist assembly on a head cover;
    (b) a positioning element having a proximal end portion and a distal end portion being directly or indirectly connected to said head cover mounting element via said proximal end portion, said positioning element including an extended arm having a shaft being connected to or integrally formed with said distal portion, said shaft being for mounting thereon the one eye vision device, said arm being for rotating a rotational movement with respect to said head cover mounting element in front of and sideways across the face of the wearer, such that when said head cover mounting element is mounted at a central location of the head cover, the one eye vision device is positionable in front of an eye of the wearer while, at the same time, said shaft is positioned external to the interpupillary distance of the wearer; and
    (c) a connector assembly being connected to said head cover mounting element, said proximal end portion of said positioning element being engaged in said connector assembly, said connector assembly being constructed so as to enable said rotational movement in front and sideways across the face of the wearer and further so as to enable an additional rotational movement in a direction substantially orthogonal to said rotational movement and away from or closer to the face of the wearer, so as to enable the wearer to comfortably change a position of said one eye vision device from one eye to the other pulling said positioning element away from the face while rotating said positioning element sideways across the face.

2. The vision assist assembly of claim 1, wherein, when said head cover mounting element is mounted at the central location of the head cover, said positioning element is rotatable to a position in which the one eye vision device is positioned in at least one non-use position external to the interpupillary distance of the wearer.

3. The vision assist assembly of claim 1, wherein said head cover mounting element includes a dovetail construction for mounting the vision assist assembly on a matching construction of the head cover.

4. The vision assist assembly of claim 1, wherein said head cover mounting element includes an interpupillary distance adjusting mechanism, whereas said positioning element being directly or indirectly connected to said head cover mounting element via said interpupillary distance adjusting mechanism.

5. The vision assist assembly of claim 1, wherein said arm is substantially Z-shaped.

6. The vision assist assembly of claim 1, wherein said connector assembly includes a chamber engaging said proximal end portion of said positioning element, said chamber houses a biasing mechanism which serves for biasing said proximal end portion of said positioning element against a rear wall of said chamber, thereby enabling pulling said positioning element away from the face while rotating said positioning element sideways across the face.

7. The vision assist assembly of claim 6, wherein said connector assembly includes at least two securing mechanisms for securing said positioning element at one of said securing mechanisms at a time.

8. The vision assist assembly of claim 6, wherein said connector assembly includes a locker for locking said positioning element at a desired position.

9. A vision assist assembly for selectable positioning of a one eye vision device in front of an eye of a wearer comprising:
    (a) a head cover mounting element for mounting the vision assist assembly on a head cover, said head cover mounting element including a dovetail construction for mounting the vision assist assembly on a matching construction of the head cover; and
    (b) a positioning element having a proximal end portion and a distal end portion being directly or indirectly connected to said head cover mounting element via said proximal end portion, said positioning element including an extended arm having a shaft being connected to or integrally formed with said distal portion, said shaft being for mounting thereon the one eye vision device, said arm being for rotating a rotational movement with respect to said head cover mounting element in front of and sideways across the face of the wearer, such that when said head cover mounting element is mounted at a central location of the head cover, the one eye vision device is positionable in front of an eye of the wearer while, at the same time, said shaft is positioned external to the interpupillary distance of the wearer.

10. The vision assist assembly of claim 9, wherein said arm is substantially Z-shaped.

11. The vision assist assembly of claim 9, wherein, when said head cover mounting element is mounted at the central location of the head cover, said positioning element is rotatable to a position in which the one eye vision device is positioned in at least one non-use position external to the interpupillary distance of the wearer.

12. The vision assist assembly of claim 9, wherein said head cover mounting element includes an interpupillary distance adjusting mechanism, whereas said positioning element being directly or indirectly connected to said head cover mounting element via said interpupillary distance adjusting mechanism.

13. The vision assist assembly of claim 9, further comprising a connector assembly being connected to said head cover mounting element, said proximal end portion of said positioning element being engaged in said connector assembly, said connector assembly being constructed so as to enable said rotational movement in front and sideways across the face of the wearer, and further so as to enable an additional rotational movement in a direction substantially orthogonal to said rotational movement and away from or closer to the face of the wearer, so as to enable the wearer to comfortably change a position of said one eye vision device from one eye to the other by pulling said positioning element away from the face while rotating said positioning element sideways across the face.

14. The vision assist assembly of claim 13, wherein said connector assembly includes a chamber engaging said proximal end portion of said positioning element, said chamber houses a biasing mechanism which serves for biasing said proximal end portion of said positioning element against a rear wall of said chamber, thereby enabling pulling said positioning element away from the face while rotating said positioning element sideways across the face.

15. The vision assist assembly of claim 14, wherein said connector assembly includes at least two securing mechanisms for securing said positioning element at one of said securing mechanisms at a time.

16. The vision assist assembly of claim 14, wherein said connector assembly includes a locker for locking said positioning element at a desired position.

\* \* \* \* \*